United States Patent
Kim (10) Patent No.: US 8,743,188 B2
(45) Date of Patent: Jun. 3, 2014

(54) STEREOSCOPIC IMAGE DISPLAY AND DRIVING METHOD THEREOF

(75) Inventor: Kiltae Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 255 days.

(21) Appl. No.: 13/312,784

(22) Filed: Dec. 6, 2011

(65) Prior Publication Data

US 2012/0147161 A1 Jun. 14, 2012

(30) Foreign Application Priority Data

Dec. 10, 2010 (KR) .......................... 10-2010-0126532

(51) Int. Cl.
- *H04N 9/47* (2006.01)
- *H04N 3/14* (2006.01)
- *H04N 13/04* (2006.01)
- *H04N 15/00* (2006.01)
- *G02B 27/22* (2006.01)
- *G02B 27/26* (2006.01)
- *G02B 27/28* (2006.01)

(52) U.S. Cl.
USPC ................ 348/58; 348/42; 348/51; 348/57; 348/790; 359/462; 359/464; 359/465; 359/489.07

(58) Field of Classification Search
USPC .......... 348/58, 42, 51, 57, 790; 359/462, 464, 359/465, 489.07
See application file for complete search history.

(56) References Cited

U.S. PATENT DOCUMENTS

| | | | | |
|---|---|---|---|---|
| 6,046,849 | A * | 4/2000 | Moseley et al. | 359/465 |
| 8,120,647 | B2 * | 2/2012 | Soh | 348/51 |
| 2010/0265230 | A1 | 10/2010 | Kang | |
| 2010/0289884 | A1 | 11/2010 | Kang | |

FOREIGN PATENT DOCUMENTS

| DE | 10 2009 034 092 A1 | 10/2010 |
|---|---|---|
| EP | 1 998 573 A2 | 12/2008 |

* cited by examiner

*Primary Examiner* — Daquan Zhao
*Assistant Examiner* — Syed Hasan
(74) *Attorney, Agent, or Firm* — Birch, Stewart, Kolasch & Birch, LLP (57) ABSTRACT

A stereoscopic image display apparatus and a driving method of the display apparatus are provided. The display apparatus includes a resolution enhancer that calculates an average brightness of first left-eye image data included in an nth (n is a natural number) line of the 3D image data and second left-eye image data included in an n+2th line of the 3D image data to obtain left-eye average data, calculates an average brightness of first right-eye image data included in an n+1th line of the 3D image data and second right-eye image data included in an n+4th line of the 3D image data to obtain right-eye average data, and converts the brightness of the left-eye average data and the right-eye average data into gray-scale values.

6 Claims, 13 Drawing Sheets

FIG. 1

(RELATED ART)

| RGBL(1) |
|---|
| RGBR(1) |
| RGBL(2) |
| RGBR(2) |
| RGBL(3) |
| RGBR(3) |
| RGBL(4) |
| RGBR(4) |
| ⋮ |

STEREOSCOPIC IMAGE DISPLAY AND DRIVING METHOD THEREOF

This application claims the benefit of Korean Patent Application no. 10-2010-0126532 filed on Dec. 10, 2010, the entire contents of which is incorporated herein by reference for all purposes as if fully set forth herein.

BACKGROUND

1. Technical Field

The embodiments of this document are directed to a stereoscopic image display apparatus and a driving method of the display apparatus.

2. Discussion of the Related Art

Figure 1:
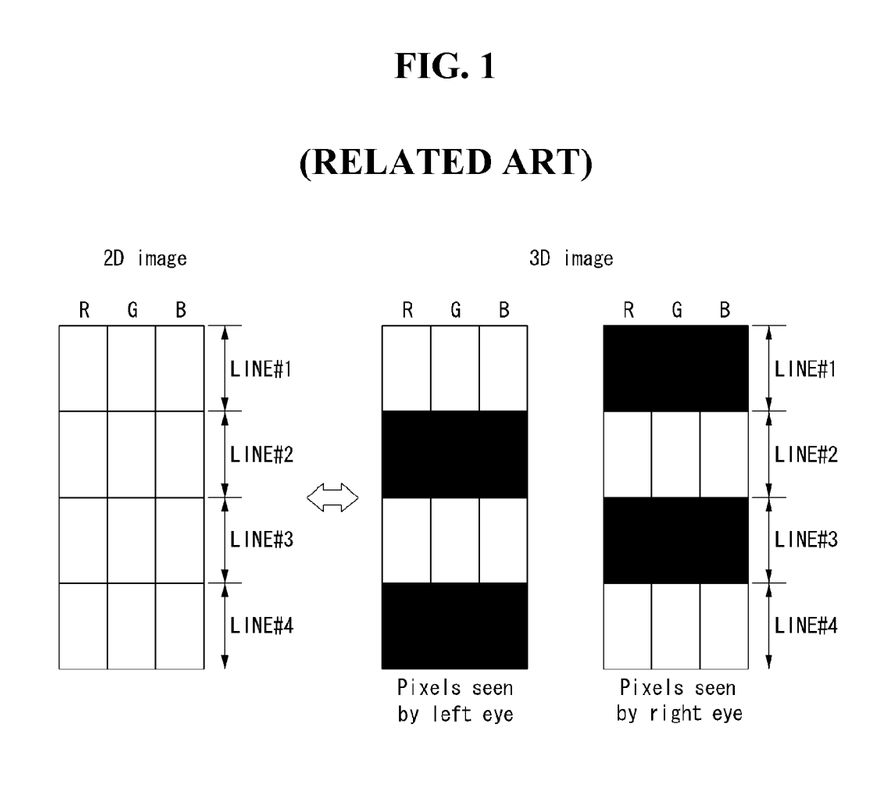
FIG. 1 is a view illustrating 3D image data input to pixels of a glasses-type stereoscopic image display apparatus using a patterned retarder.

As an example for displaying and viewing a 3D image, there is a way of employing a patterned retarder. This way is advantageous in that it causes less crosstalk between left-eye and right-eye images in a 3D image and that it allows for good quality. However, the stereoscopic image display apparatus using a patterned retarder suffers from low brightness when displaying a 2D image and a low upper-and-lower view angle when displaying a 3D image together with reduced resolution by about 50%. For example, the patterned retarder transmits only first polarized light of left-eye image light incident from odd-numbered lines of a display panel and only second polarized light of right-eye image light incident from even-numbered lines of the display panel. A user may view the first polarized light through a left-eye polarization filter of polarization glasses and the second polarized light through a right-eye polarization filter of the polarization glasses. Accordingly, as shown in FIG. 1, when a 3D left-eye image is displayed on odd-numbered display lines LINE#1 and LINE#3 of the display panel during an Nth (N is a positive integer) frame period, and a 3D right-eye image is displayed on even-numbered display lines LINE#2 and LINE#4 of the display panel during an N+1th frame period, the user ends up alternately viewing the 3D left-eye image and the 3D right-eye image with resolution of 50% relative to the resolution of the display panel.

SUMMARY

The embodiments of this document provide a stereoscopic image display apparatus using a patterned retarder, which can reduce a lowering in resolution upon display of a 3D image and can prevent a flicker from occurring when driven at a low frequency.

According to an embodiment of this document, there is provided a stereoscopic image display apparatus comprising a display panel including pixels that are arranged in a matrix pattern at intersections of data lines and gate lines, a display panel driver that increase resolution of input 3D image data and displays the 3D image data on the display panel, a patterned retarder that includes a first retarder transmitting first polarized light from odd-numbered lines of the display panel and a second retarder transmitting second polarized light from even-numbered lines of the display panel, and polarization glasses that includes a first polarization filter transmitting the first polarized light from the first retarder and a second polarization filter transmitting the second polarized light from the second retarder.

The display panel driver includes a resolution enhancer that calculates an average brightness of first left-eye image data included in an nth (n is a natural number) line of the 3D image data and second left-eye image data included in an n+2th line of the 3D image data to obtain left-eye average data, calculates an average brightness of first right-eye image data included in an n+1th line of the 3D image data and second right-eye image data included in an n+4th line of the 3D image data to obtain right-eye average data, and converts the brightness of the left-eye average data and the right-eye average data into grayscale values.

According to an embodiment of this document, there is provided a driving method of a stereoscopic image display apparatus, which comprises calculating an average brightness of first left-eye image data included in an nth (n is a natural number) line of the 3D image data and second left-eye image data included in an n+2th line of the 3D image data to obtain left-eye average data, calculating an average brightness of first right-eye image data included in an n+1th line of the 3D image data and second right-eye image data included in an n+4th line of the 3D image data to obtain right-eye average data, converting the brightness of the left-eye average data and the right-eye average data into grayscale values, and displaying the converted left-eye average data and the converted right-eye average data on the display panel.

BRIEF DESCRIPTION OF THE DRAWINGS

The accompanying drawings, which are included to provide a further understanding of this document and are incorporated in and constitute a part of this specification, illustrate embodiments of this document and together with the description serve to explain the principles of this document. In the drawings.

DETAILED DESCRIPTION OF THE EMBODIMENTS

Hereinafter, exemplary embodiments of this document will be described with reference to the accompanying drawings, wherein the same reference numerals may be used to denote the same or substantially the same elements throughout the drawings and the specification. The description of well-known functions or structures, which makes the gist of this document unnecessarily unclear or equivocal, will be omitted.

Figure 2:
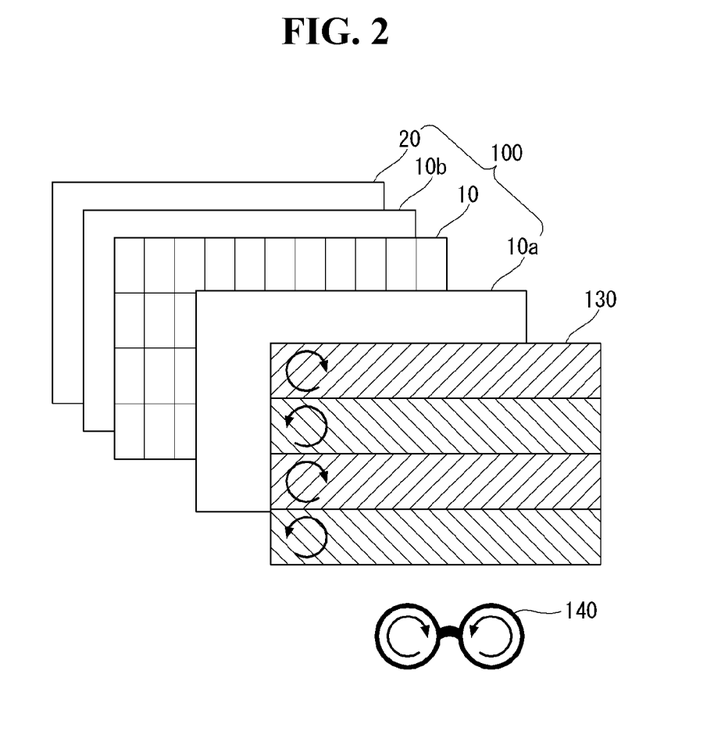
FIG. 2 is a view illustrating a structure of a stereoscopic image display apparatus according to an embodiment of this document.
Figure 3:
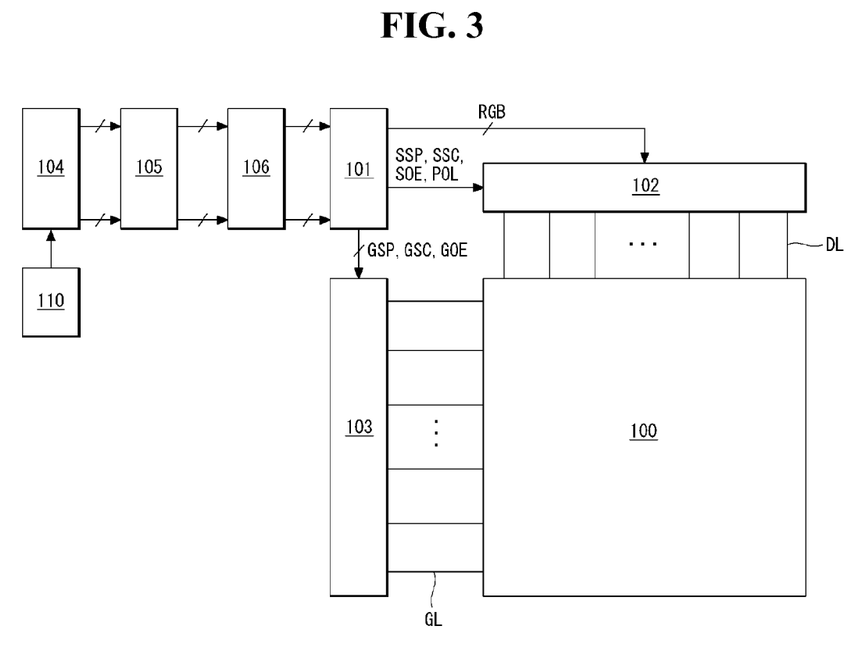
FIG. 3 is a block diagram illustrating a display panel and drivers in a stereoscopic image display apparatus according to an embodiment of this document.

FIGS. 2 and 3 are views illustrating a stereoscopic image display apparatus according to an embodiment of this document.

Referring to FIGS. 2 and 3, a stereoscopic image display apparatus according to an embodiment includes a display panel 100, a patterned retarder 130, polarization glasses 140, and drivers 101 to 106 for driving the display panel 100.

The display panel 100 displays 2D or 3D image data. According to an embodiment, the display panel 100 is implemented as a flat-type display, such as a liquid crystal display (LCD), a field emission display (FED), a plasma display panel (PDP), an electroluminescence device (EL) including inorganic or organic light emitting diode, or an electrophoresis display (EPD). Hereinafter, for ease of description, it is assumed that the display panel 100 is a LCD panel.

The display panel 100 includes two glass substrates and a liquid crystal layer between the glass substrates. The display panel 100 includes liquid crystal cells that are arranged in a matrix pattern at intersections of data lines DL and gate lines GL.

Figure 7:
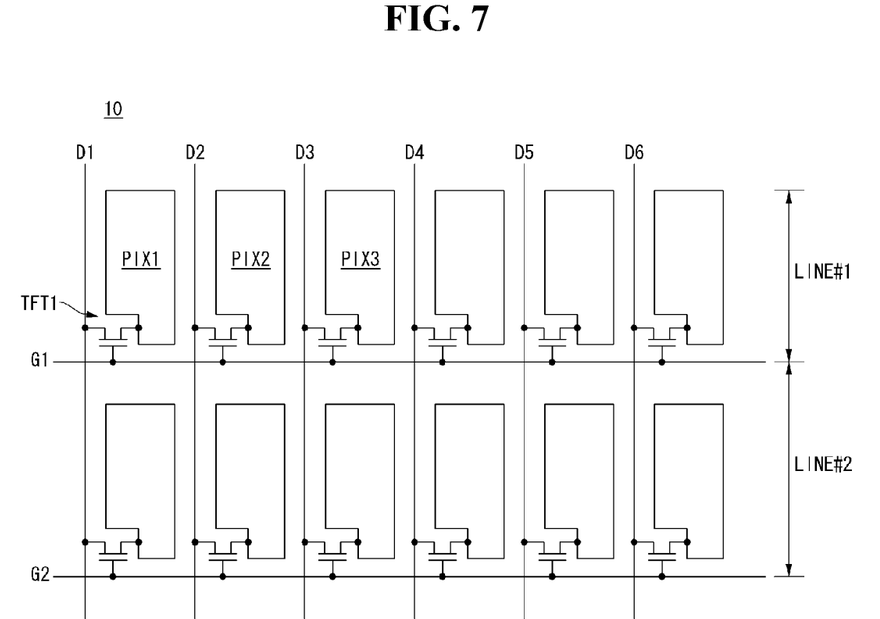
FIG. 7 is a circuit diagram illustrating a pixel array of a display panel according to an embodiment of this document.
Figure 9:
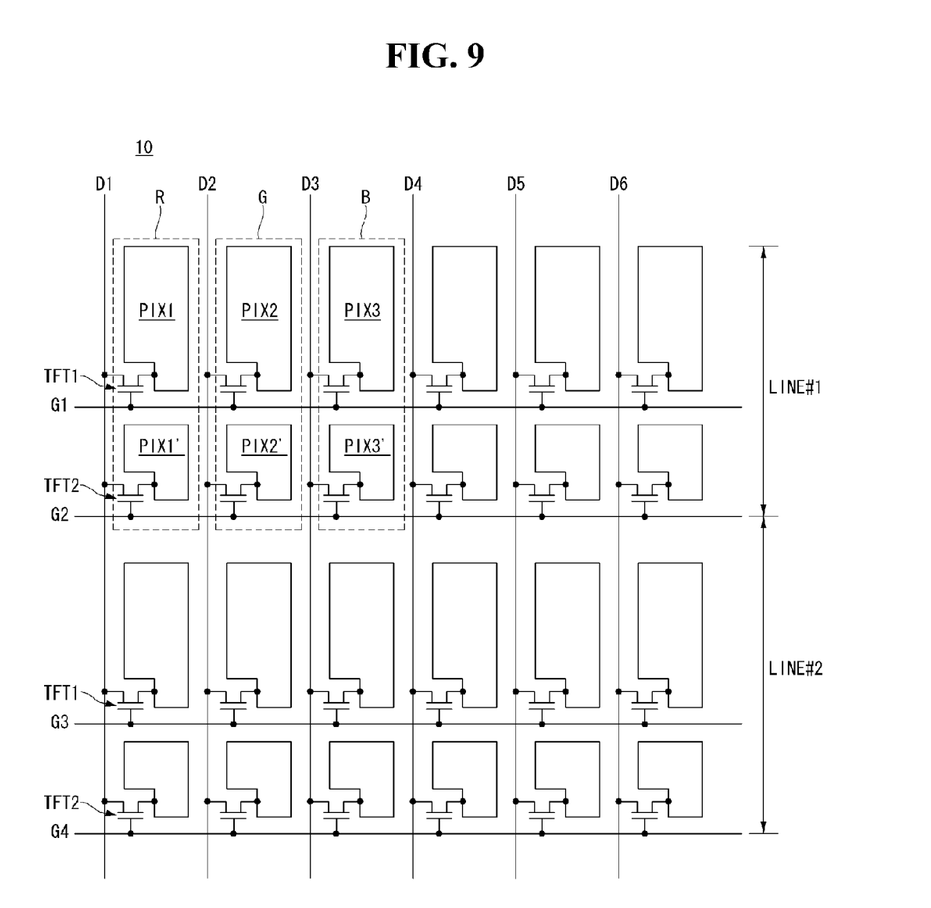
FIG. 9 is a circuit diagram illustrating a pixel array of a display panel according to an embodiment of this document.

On a TFT (Thin Film Transistor) array substrate of the display panel 100 are formed the data lines DL, the gate lines GL, TFTs, pixel electrodes, and storage capacitors Cst. A pixel array of the display panel 100 is implemented as shown in FIG. 7 or FIG. 9. The liquid crystal cells are driven by electric fields generated between a common electrode and the pixel electrodes connected to the TFTs. On a color filter array substrate of the display panel 100 are formed black matrixes, color filters, and common electrode. Polarization films 10*a* and 10*b* are attached on the TFT array substrate and the color filter array substrate, respectively. The display panel 100 further includes an alignment film for setting a pre-tilt angle of liquid crystal molecules. According to an embodiment, a column spacer is provided between the TFT array substrate and the color filter array substrate to maintain a cell gap of the liquid crystal cells. According to embodiments, the display panel 100 is driven in a vertical electric field driving mode, such as a TN (Twisted Nematic) mode or a VA (Vertical Alignment) mode, or in a horizontal electric field driving mode, such as an IPS (In Plane Switching) mode or an FFS (Fringe Field Switching) mode.

According to embodiments, the liquid crystal display (LCD) is implemented as a transmissive LCD, a transflective LCD, or a reflective LCD. The transmissive or transflective LCD requires a backlight unit, such as a backlight unit 20. According to an embodiment, the backlight unit 20 is implemented as a direct-type backlight unit or an edge-type backlight unit.

The patterned retarder 130 is attached on the upper polarization film 10*a* of the display panel 100. The patterned retarder 130 includes a first retarder which is arranged on odd-numbered display lines and a second retarder which is arranged on even-numbered display lines. An optical absorption axis of the first retarder is different from an optical absorption axis of the second retarder. The first retarder of the patterned retarder 130 faces odd-numbered display lines of the pixel array and transmits first polarized light (circular polarized light or linear polarized light) of light incident from the odd-numbered display lines of the pixel array. The second retarder of the patterned retarder 130 faces even-numbered display lines of the pixel array and transmits second polarized light (circular polarized light or linear polarized light) of light incident from the even-numbered display lines of the pixel array. According to an embodiment, the first retarder is implemented as a polarization filter that transmits left-circular polarized light, and the second retarder is implemented as a polarization filter that transmits right-circular polarized light.

The polarization glasses 140 include a left-eye polarization filter (or a first polarization filter) that has the same optical absorption axis as the first retarder and a right-eye polarization filter (or a second polarization filter) that has the same optical absorption axis as the second retarder. According to an embodiment, the left-eye polarization filter of the polarization glasses 140 is selected as a left-circular polarization filter, and the right-eye polarization filter of the polarization glasses 140 is selected as a right-circular polarization filter. A user can watch a 3D image displayed on the stereoscopic image display apparatus through the polarization glasses 140.

The drivers 101 to 103 include a data driver 102, a gate driver 103, a timing controller 101, a host system 104, a 3D data formatter 105, and a 3D resolution enhancer 106.

Each source drive IC of the data driver 102 includes a shift register, a latch, a digital-to-analog convertor (DAC), and an output buffer. The data driver 102 latches digital video data RGB under control of the timing controller 101. In response to a polarity control signal POL, the data driver 102 converts the digital video data RGB into analog positive gamma compensation voltages and negative gamma compensation voltages to inverse polarities of data voltages. The data driver 102 outputs the data voltages to the data lines DL.

The data driver 102 outputs 2D image data voltages in 2D mode. The 2D image data voltages do not show any difference between left-eye images and right-eye images. In 3D mode, the data driver 102 supplies left-eye image data voltages and right-eye image data voltages (refer to FIGS. 13 and 14) to the data lines DL.

The gate driver 103 includes a shift register and a level shifter. Under control of the timing controller 101, the gate driver 103 sequentially supplies gate pulses (or scan pulses, see FIGS. 13 and 14) to the gate lines GL in synchronization with the data voltages supplied to the data lines DL.

The timing controller 101 receives from the host system 104 timing signals, such as a vertical synchronization signal Vsync, a horizontal synchronization signal Hsync, a data enable signal DE, and a dot clock CLK, and generates control signals for controlling operation timing of the data driver 102 and the gate driver 103. The control signals include a gate timing control signal for controlling operation timing of the gate driver 103 and a data timing control signal for controlling operation timing of the data driver 102 and polarities of the data voltages. The timing controller 101 receives a mode signal from the host system 104 to determine the 2D or 3D mode.

In 2D mode, the timing controller 101 transmits 2D image data to the data driver 102 at an input frame frequency or at a frame frequency corresponding to the input frame frequency×i (where, i is a natural number) Hz. The input frame frequency is 60 Hz for the NTSC (National Television Standards Committee) mode and 50 Hz for the PAL (Phase-Alternating Line) mode. In 3D mode, the timing controller 101 transmits 3D image data to the data driver 102 at a frame frequency corresponding to the input frame frequency×I Hz. Hereinafter, it is assumed that the frame frequency for the 3D mode is 60 Hz for convenience of description, however, the embodiments of this document are not limited thereto.

The gate timing control signal includes a gate start pulse GSP, a gate shift clock GSC, and a gate output enable signal GOE. During one frame period, the gate start pulse GSP occurs simultaneously with the start of the frame period and is then applied to a gate drive IC to produce a first gate pulse. The gate shift clock GSC is jointly input to the gate drive ICs and shifts the gate start pulse GSP. The gate output enable signal GOE controls the output of the gate drive ICs.

The data timing control signal includes a source start pulse SSP, a source sampling clock SSC, a polarity control signal POL, and a source output enable signal SOE. The source start pulse SSP controls data sampling start timing of the data driver 102. The source sampling clock SSC controls data sampling timing of the data driver 102 based on a rising or falling edge. The polarity control signal POL controls polarities of data voltages output from the data driver 102. The source output enable signal SOE controls output timing of the data driver 102. When digital video data input to the data driver 102 has a mini LVDS (Low Voltage Differential Signaling) interface standard, the source start pulse SSP and the source sampling clock SSC can be omitted.

The host system 104 supplies the 2D or 3D image data and timing signals Vsync, Hsync, DE, and CLK to the timing controller 101 via an interface, such as an LVDS (Low Voltage Differential Signaling) interface or a TMDS (Transition Minimized Differential Signalling) interface. The host system 104 supplies the timing controller 101 with a mode signal indicating a 2D mode or a 3D mode. The host system 104 supplies 2D image data to the timing controller 101 in the 2D mode, and supplies 3D image data including left-eye images and right-eye images to the 3D data formatter 105 in the 3D mode.

A user selects the 2D mode or 3D mode through a user input device 110. The user input device 110 includes a touch screen attached on or embedded in the display panel 100, an on-screen display (OSD), a keyboard, a mouse, or a remote controller.

In response to user data input through the user input device 110, the host system 104 switches between 2D mode operation and 3D mode operation. The host system 104 detects a 2D/3D identification code encoded to the input image data, for example, a 2D/3D identification code that may be coded to an EPG (Electronic Program Guide) or an ESG (Electronic Service Guide) of a digital broadcast standard, to distinguish the 2D mode and 3D mode.

Figure 4:
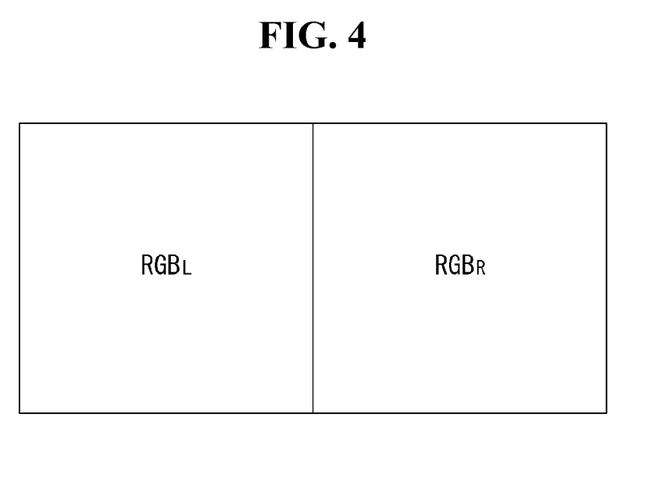
FIG. 4 is a view illustrating one frame of 3D image data input to the 3D formatter shown in FIG. 3.
Figure 5:
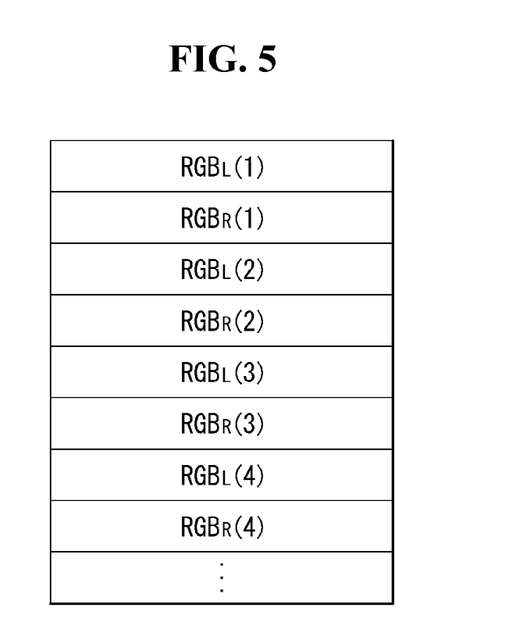
FIG. 5 is a view illustrating a 3D image data format converted by the 3D data formatter shown in FIG. 3.

The 3D data formatter 105 receives 3D image data as shown in FIG. 4, separates left-eye image data RGBL and right-eye image data RGBR from the 3D image data, and rearranges the left-eye and right-eye image data RGBL and RGBR on each line as shown in FIG. 5. The 3D image data rearranged by the 3D data formatter 105 is input to the 3D resolution enhancer 106. FIG. 4 illustrates an exemplary frame format of the 3D image data input to the 3D data formatter 105. As shown in FIG. 4, one frame of 3D image data includes the left-eye image data RGBL at a left half portion and the right-eye image data RGBR at a right half portion. FIG. 5 illustrates an example where the left-eye image data RGBL are assigned on odd-numbered lines and the right-eye image data RGBR are assigned on even-numbered lines.

After receiving the 3D image data as shown in FIG. 5, the 3D resolution enhancer 106 calculates an average brightness for the left-eye image data RGBL on neighboring lines, and an average brightness for the right-eye image data RGBR on neighboring lines. For instance, the 3D resolution enhancer 106 calculates an average brightness for first left-eye image data on an nth line and second left-eye image data on an n+2th line, and obtains average brightness data RGB'L for the left-eye image, wherein n is a natural number. The 3D resolution enhancer 106 calculates an average brightness for first right-eye image data on an n+1th line and second right-eye image data on an n+4th line, and obtains average brightness data RGB'R for the right-eye image, wherein n is a natural number. Then, the 3D resolution enhancer 106 converts the average brightness data RGB'L and RGB'R into grayscale values, thereby increasing resolution of the 3D image data. Hereinafter, the average brightness data RGB'L is also referred to as "left-eye average data", and the average brightness data RGB'R is also referred to as "right-eye average data".

Figure 6:
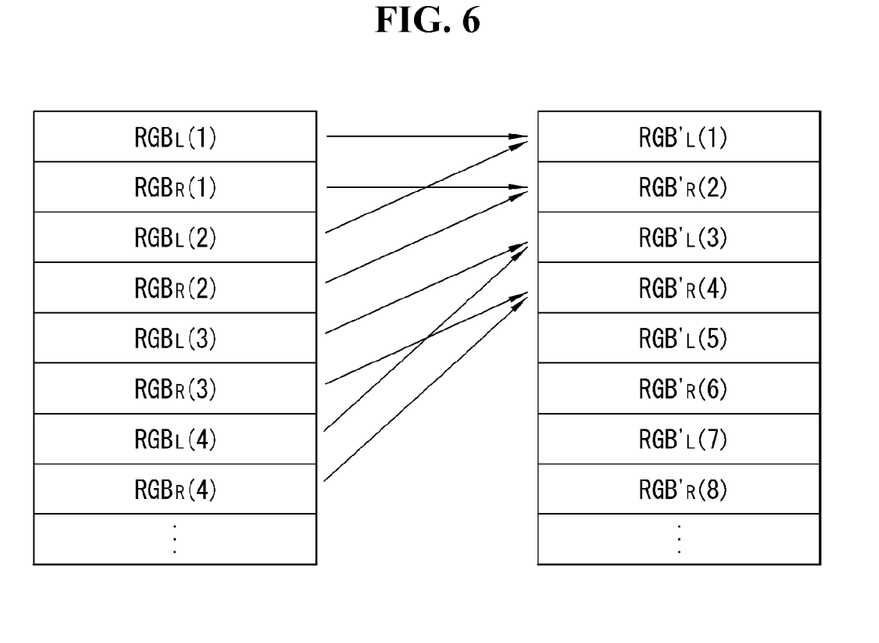
FIG. 6 is a view illustrating input and output data of the 3D resolution enhancer shown in FIG. 3.

FIG. 6 illustrates input and output data of the 3D resolution enhancer 106 shown in FIG. 3.

Referring to FIG. 6, the first left-eye average data RGB'L(1) has an average value of first left-eye image data RGBL(1) arranged on a first line of an 3D image input to the 3D data formatter 105 and second left-eye image data RGBL(2) arranged on a third line of the 3D image. The first left-eye average data RGB'L(1) is written to one of R, G, and B subpixels of a pixel present in a first line of the display panel 100 (LINE#1 of FIGS. 7 and 9).

The first right-eye average data RGB'R(2) has an average value of first right-eye image data RGBR(1) arranged on a second line of the 3D image input to the 3D data formatter 105 and second right-eye image data RGBR(2) arranged on a fourth line of the 3D image. The first right-eye average data RGB'R(2) is written to one of R, G, and B subpixels of a pixel present in a second line of the display panel 100 (LINE#2 of FIGS. 7 and 9).

The second left-eye average data RGB'L(3) has an average value of third left-eye image data RGBL(3) arranged on a fifth line of the 3D image input to the 3D data formatter 105 and fourth left-eye image data RGBL(4) arranged on a seventh line of the 3D image. The second left-eye average data RGB'L(3) is written to one of R, G, and B subpixels of a pixel present in a third line of the display panel 100.

The second right-eye average data RGB'R(4) has an average value of third right-eye image data RGBR(3) arranged on a sixth line of the 3D image input to the 3D data formatter 105 and fourth right-eye image data RGBR(4) arranged on an eighth line of the 3D image. The second right-eye average data RGB'R(4) is written to one of R, G, and B subpixels of a pixel present in a fourth line of the display panel 100.

Figure 13:
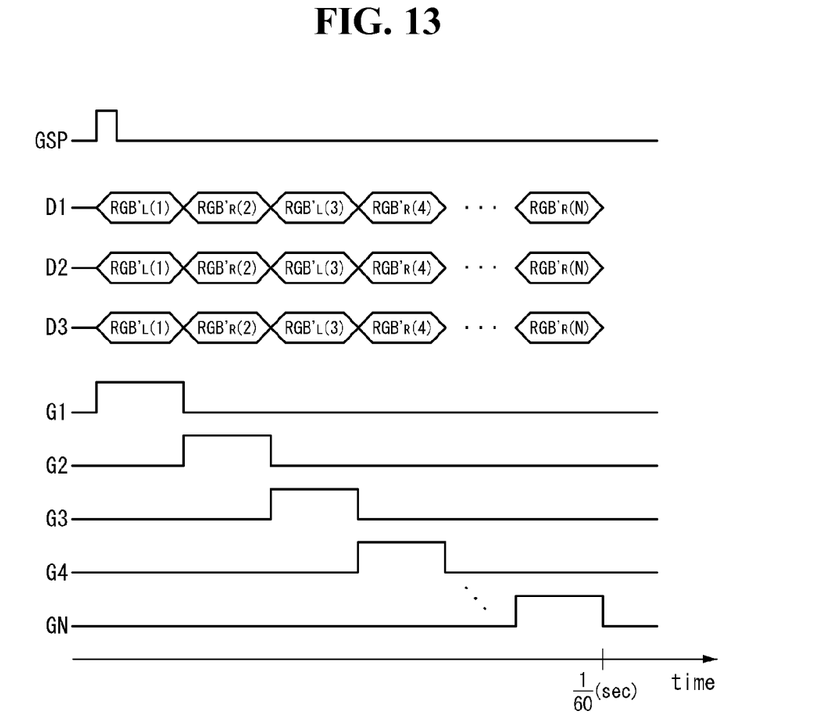
FIG. 13 is a waveform diagram illustrating the 3D image data and gate pulses of FIG. 6 as written to the pixel array shown in FIG. 7.
Figure 14:
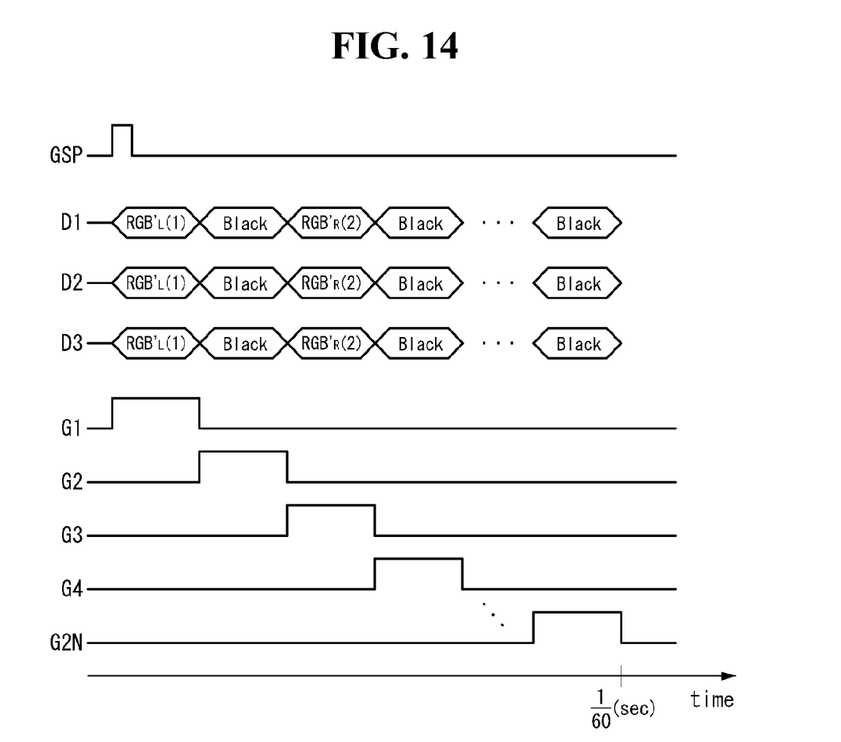
FIG. 14 is a waveform diagram illustrating the 3D image data and gate pulses of FIG. 6 as written to the pixel array shown in FIG. 9.

A user can see the left-eye average data RGB'L(1), RGB'L(3), . . . RGB'L(N−1) displayed on odd-numbered display lines LINE#1, LINE#3 . . . LINE#N−1 of the display panel 100 through the left-eye filter of the polarization glasses 140, and the right-eye average RGB'R(2), RGB'R(4), . . . RGB'R(N) displayed on even-numbered display lines LINE#2, LINE#4 . . . LINE#N of the display panel 100 through the right-eye filter of the polarization glasses 140. Accordingly, the user may feel resolution enhanced by two times that shown in FIG. 1 every frame when seeing the 3D image data as shown in FIG. 6. Further, since the left-eye and right-eye average data is displayed on the display panel 100 every frame as the average brightness data, even though the 3D image data is displayed at a low frequency, such as 60 Hz, as shown in FIGS. 13 and 14, the user may enjoy 3D images without feeling no or few flickers.

FIG. 7 is a circuit diagram illustrating a pixel array of a display panel according to an embodiment of this document.

Figure 8A:
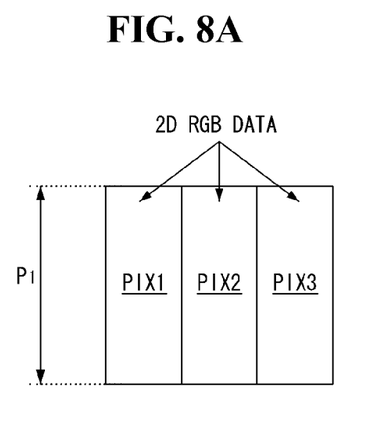
FIGS. 8A and 8B are views illustrating 2D image data and 3D image data, respectively, which are written to pixels of the pixel array shown in FIG. 7.
Figure 8B:
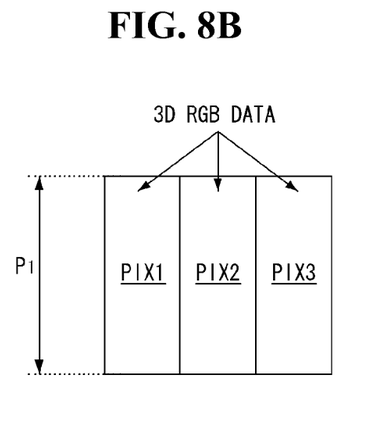

FIGS. 8A and 8B are views illustrating 2D image data and 3D image data, respectively, which are written to pixels shown in FIG. 7.

Referring to FIG. 7, the pixel array of the display panel 100 includes M×N (M and N are positive integers) pixels. Each pixel includes a liquid crystal cell for a red subpixel R, a liquid crystal cell for a green subpixel G, and a liquid crystal cell for a blue subpixel B.

The subpixels include respective corresponding pixel electrodes PIX1 to PIX3 and respective corresponding TFTs TFT1. The TFTs TFT1 supply data voltages from the data lines D1 to D6 to the pixel electrodes PIX1 to PIX3 in response to gate pulses from the gate lines G1 and G2. The gate electrodes of the TFTs TFT1 are connected to the gate lines G1 and G2. The drain electrodes of the TFTs TFT1 are connected to the data lines D1 to D6, and the source electrodes of the TFTs TFT1 are connected to the pixel electrodes PIX1 to PIX3.

2D image data as shown in FIG. 8A and 3D image data as shown in FIG. 8B are written to the pixels of the pixel array as shown in FIG. 7.

Figure 10A:
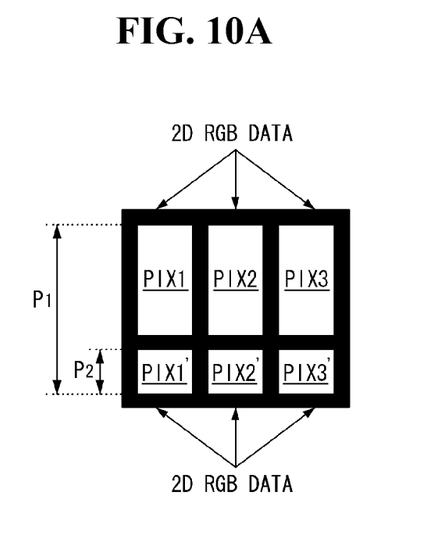
FIGS. 10A and 10B are views illustrating 2D image data and 3D image data, respectively, which are written to pixels of the pixel array shown in FIG. 9.
Figure 10B:
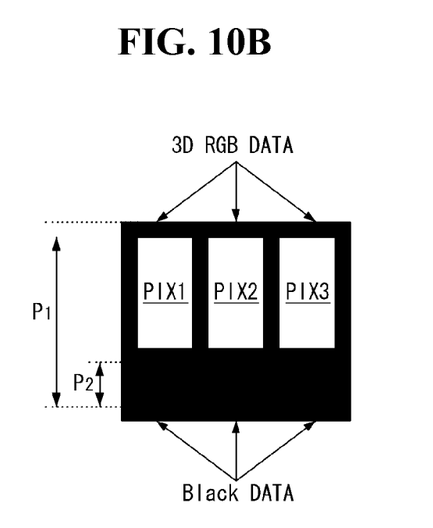

FIG. 9 is a circuit diagram illustrating a pixel array of a display panel according to an embodiment of this document. FIGS. 10A and 10B illustrate 2D image data and 3D image data, respectively, which are written to pixels of the pixel array shown in FIG. 9.

Referring to FIG. 9, the pixel array includes M×N pixels. Each pixel includes a liquid crystal cell for a red subpixel, a liquid crystal cell for a green subpixel, and a liquid crystal cell for a blue subpixel. Each subpixel includes a main subpixel and an auxiliary subpixel.

The main subpixels include respective corresponding main pixel electrodes PIX1 to PIX3 and respective corresponding first TFTs TFT1. The first TFTs TFT1 supply data voltages from the data lines D1 to D6 to the main pixel electrodes PIX1 to PIX3 in response to gate pulses from odd-numbered gate lines G1 and G3. The gate electrodes of the first TFTs TFT1 are connected to the odd-numbered gate lines G1 and G3. The drain electrodes of the first TFTs TFT1 are connected to the data lines D1 to D6, and the source electrodes of the first TFTs TFT1 are connected to the main pixel electrodes PIX1 to PIX3.

The auxiliary subpixels include respective corresponding auxiliary pixel electrodes PIX1' to PIX3' and respective corresponding second TFTs TFT2. The second TFTs TFT2 supply data voltages from the data lines D1 to D6 to the auxiliary pixel electrodes PIX1' to PIX3' in response to gate pulses from even-numbered gate lines G2 and G4. The gate electrodes of the second TFTs TFT2 are connected to the even-numbered gate lines G2 and G4. The drain electrodes of the second TFTs TFT2 are connected to the data lines D1 to D6, and the source electrodes of the second TFTs TFT2 are connected to the auxiliary pixel electrodes PIX1' to PIX3'.

The auxiliary subpixels are charged with red, green, and blue data voltages of 2D images in the 2D mode as shown in FIG. 10A, thereby increasing brightness and chromaticity of the 2D images to enhance display quality of the 2D images. The auxiliary subpixels are charged with black data voltages in the 3D mode as shown in FIG. 10B, thereby increasing upper and lower view angles of the stereoscopic image display apparatus. For example, the auxiliary subpixels function as active black stripes to increase the upper and lower view angles.

While the upper and lower view angles of the 3D image are proportional to a ratio of a vertical pitch P1 of a main subpixel and a vertical pitch P2 of an auxiliary subpixel {(P2*100)/P1}, the brightness of the 3D image is inversely proportional to the ratio {(P2*100)/P1}. Accordingly, the vertical pitch P1 of the main subpixel and the vertical pitch P2 of the auxiliary subpixel need to be properly designed in consideration of the upper and lower view angle and brightness of the 3D image. The vertical pitch P2 of the auxiliary subpixel is designed to be smaller than the vertical pitch P1 of the main subpixel.

Figure 11:
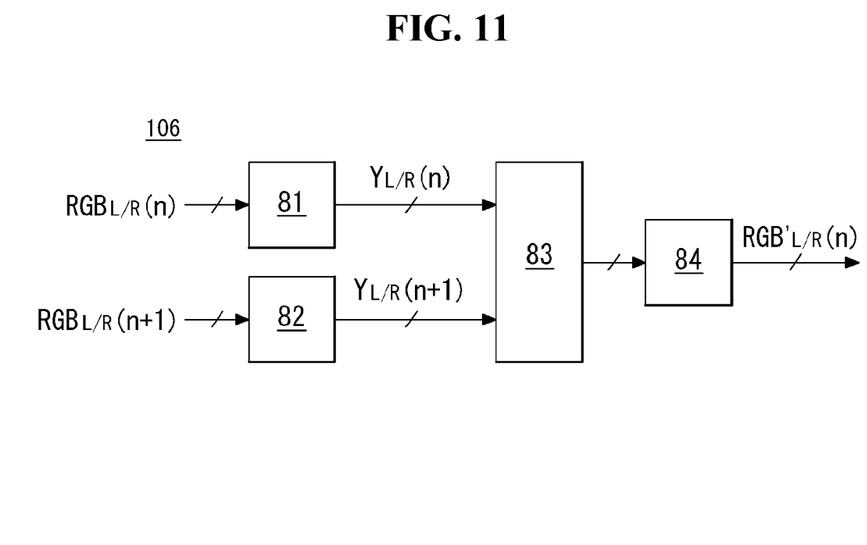
FIG. 11 is a view illustrating in detail the 3D resolution enhancer shown in FIG. 3.

FIG. 11 is a view illustrating the 3D resolution enhancer 106 in further detail.

Referring to FIG. 11, the 3D resolution enhancer 106 includes gamma calibration units 81 and 82, a resolution compensation unit 83, and a de-gamma calibration unit 84.

nth single-eye (left-eye or right-eye) image data $RGB_{L/R}(n)$ and n+1th single-eye image data $RGB_{L/R}(n+1)$ are input to the 3D resolution enhancer 106.

The gamma calibration units 81 and 82 include a first gamma calibration unit 81 for gamma-calibrating the nth single-eye image data $RGB_{L/R}(n)$ and a second gamma calibration unit 82 for gamma-calibrating the n+1th single-eye image data $RGB_{L/R}(n+1)$. Each of the first and second gamma calibration units 81 and 82 substitutes 8 bit input data into Equation 1 to calculate brightness Y of the input data as felt by a user in 2.2 gamma characteristics. The first and second gamma calibration units 81 and 82 supply brightness values Y of the input data to the resolution compensation unit 83.

$$Y_{L/R} = \left(\frac{RGB_{L/R}}{255}\right)^{2.2} \qquad \text{[Equation 1]}$$

As in Equation 2, the resolution compensation unit 83 divides the brightness values G2Y(n) and G2Y(n+1) input from the first and second gamma calibration units 81 and 82 by 2 to calibrate an average brightness value L(n) and supplies a result to the de-gamma calibration unit 84.

$$L(n) = \frac{Y_{L/R}(n) + Y_{L/R}(n+1)}{2} \qquad \text{[Equation 2]}$$

Here, $Y_{L/R}(n)$ is a brightness value of the nth single-eye image data $RGB_{L/R}(n)$, and $Y_{L/R}(n+1)$ is a brightness value of the n+1th single-eye image data $RGB_{L/R}(n+1)$.

The de-gamma calibration unit 84 converts the average brightness value L(n) input from the resolution compensation unit 83 into a grayscale value $RGB'_{L/R}(n)$.

$$RGB'_{L/R}(n) = 255 \times L(n)^{\frac{1}{2.2}} \qquad \text{[Equation 3]}$$

Figure 12:
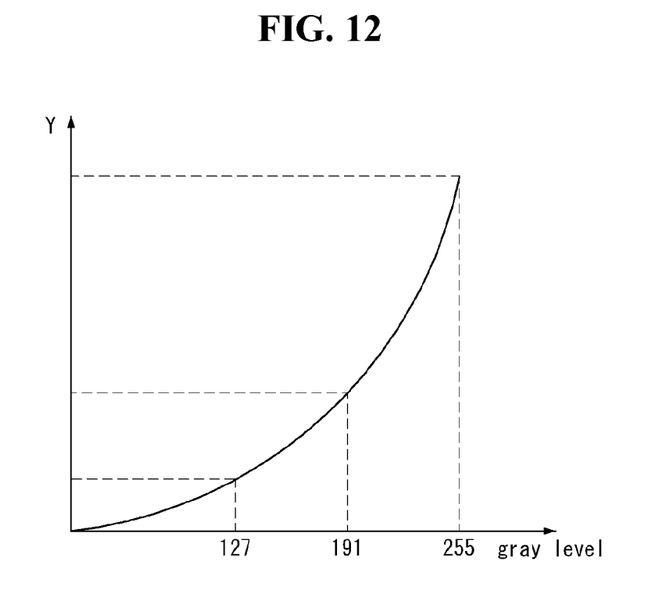
FIG. 12 is a view illustrating a 2.2 gamma curve.

When the nth left-eye image data RGBL(n) whose grayscale value is "255" and the n+1th left-eye image data RGBL(n+1) whose grayscale value is "0" are input to the 3D resolution enhancer 106, the gamma calibration units 81 and 82 substitute the grayscale values into Equation 1, thereby outputting (255/255)2.2=1 and (0/255)2.2=0. The resolution compensation unit 83 substitutes brightness values 1 and 0 into Equation 2 to calibrate (1+0)/2=0.5 as the average brightness value, and the de-gamma calibration unit 84 substitutes the average brightness value of 0.5 into Equation 3 to calculate 255*(0.5)1/2.2=186 as the grayscale value. A grayscale value corresponding to 50% of the maximum brightness value over the 2.2 gamma curve shown in FIG. 12 is '191'. The grayscale value of 50% calculated in the above example is 186, which is similar to a grayscale value of ideal 50% brightness—for example, '191'. Accordingly, the 3D resolution enhancer 106 yields the average brightness value of the nth and n+1th single-eye image data as substantially the same value as the actual brightness felt by a user over the 2.2 gamma curve.

FIG. 13 is a waveform diagram illustrating the 3D image data and gate pulses of FIG. 6 as written to the pixel array shown in FIG. 7. Referring to FIG. 13, GSP refers to a gate start pulse, D1 to D3 refer to data voltages supplied to the first to third data lines, and G1 to Gn refer to gate pulses sequentially supplied to the first to nth gate lines in synchronization with the data voltages.

Referring to FIG. 13, the data driver 102 alternately supplies the data voltages of the left-eye average data RGB'L(1), RGB'L(3) . . . RGB'L(N−1) and the data voltages of the right-eye average data RGB'R(2), RGB'R(4) . . . RGB'R(N) to the data lines DL. The gate driver 103 sequentially supplies the gate pulses to the gate lines GL in synchronization with the data voltages supplied to the data lines.

FIG. 14 is a waveform diagram illustrating the 3D image data and gate pulses of FIG. 6 as written to the pixel array shown in FIG. 9. Referring to FIG. 14, GSP refers to a gate start pulse, D1 to D3 refer to data voltages supplied to the first to third data lines, and G1 to G2$n$ refer to gate pulses sequentially supplied to the first to 2nth gate lines in synchronization with the data voltages.

Referring to FIG. 14, the data driver 102 sequentially supplies the data voltages of the left-eye average data RGB'L(1), RGB'L(3) . . . RGB'L(N−1), the data voltages of black data, the data voltages of the right-eye average data RGB'R(2), RGB'R(4) . . . RGB'R(N), and the data voltages of black data to the data lines DL. The gate driver 103 sequentially supplies the gate pulses to the gate lines GL in synchronization with the data voltages supplied to the data lines.

The black data is generated by the timing controller 101 and input to the data driver 102. The black data is pre-stored in a register of the timing controller 101 as data 00000000$_2$ of grayscale '0'. The timing controller 101 inserts the black data between the left-eye average data RGB'L(1), RGB'L(3) . . . RGB'L(N−1) and the right-eye average data RGB'R(2), RGB'R(4) . . . RGB'R(N) and supplies resultant data to the data driver 102.

Figure 15:
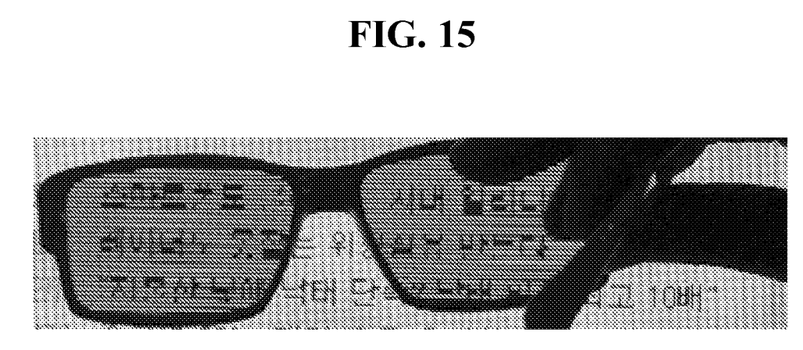
FIG. 15 is a view illustrating an experimental result for the 3D image data shown in FIG. 1.
Figure 16:
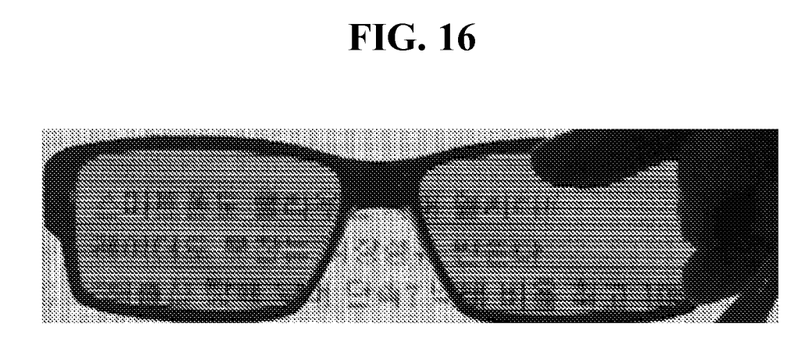
FIG. 16 is a view illustrating an experimental result for the 3D image data shown in FIG. 6.

To make a comparison on resolution between the 3D image data shown in FIG. 1 and the 3D image data shown in FIG. 6, the inventors visually identified experimental results through the 140, with the sample images of FIGS. 15 and 16 displayed on the same LCD panel. As a consequence, in contrast to the experiment result shown in FIG. 15, in which it is difficult to identify the letters due to low resolution, the experimental result shown in FIG. 6 showed that enhancement in resolution made the letters more clearly identified. The stereoscopic image display apparatus used for the experiments adopts the liquid crystal module as shown in FIG. 2, which has resolution of 1920×1080 with 47" size.

According to embodiments, the stereoscopic image display apparatus may be implemented as other flat-type displays than the LCD. For example, according to an embodiment, the 100 and the backlight unit may be replaced by a FED, a PDP, an EL display including an inorganic light emitting diode display and an organic light emitting diode display, or an EPD.

As described above, the embodiments of this document calculate average brightness of left-eye and right-eye image data present on neighboring lines and displays the average brightness data on all the lines of the display panel, thereby raising resolution and preventing a flicker from occurring when driven at a low frequency.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display apparatus comprising:
    a display panel including pixels that are arranged in a matrix pattern at intersections of data lines and gate lines;
    a display panel driver that increases resolution of input 3D image data and displays the 3D image data on the display panel;
    a patterned retarder that includes a first retarder transmitting first polarized light from odd-numbered lines of the display panel and a second retarder transmitting second polarized light from even-numbered lines of the display panel; and
    polarization glasses that includes a first polarization filter transmitting the first polarized light from the first retarder and a second polarization filter transmitting the second polarized light from the second retarder,
    wherein the display panel driver includes a resolution enhancer that calculates an average brightness of first left-eye image data included in an nth (n is a natural number) line of the 3D image data and second left-eye image data included in an n+2th line of the 3D image data to obtain left-eye average data, calculates an average brightness of first right-eye image data included in an n+1th line of the 3D image data and second right-eye image data included in an n+4th line of the 3D image data to obtain right-eye average data, and converts the brightness of the left-eye average data and the right-eye average data into grayscale values.

2. The stereoscopic image display apparatus of claim 1, wherein the display panel driver comprises:
    a data driver that converts left-eye image digital data including the grayscale value of the left-eye average data and right-eye image digital data including the grayscale value of the right-eye average data into data voltages and supplies the data voltages to the data lines of the display panel,
    a gate driver that sequentially supplies gate pulses to the gate lines of the display panel in synchronization with the data voltages, and
    a timing controller that supplies the left-eye image digital data and the right-eye image digital data to the data driver and controls operation timing of the data driver and the gate driver, and a 3D data formatter that separates left-eye image data and right-eye image data from 3D image data input from an external source and assigns the first left-eye image data, the second left-eye image data, the first right-eye image data, and the second right-eye image data to the nth line, the n+2th line, the n+1th line, and the n+3th line, respectively.

3. The stereoscopic image display apparatus of claim 1, wherein the 3D enhancer comprises:
    a gamma calibration unit that calibrates brightness of each of the first left-eye image data, the second left-eye image data, the first right-eye image data, and the second right-eye image data based on 2.2 gamma characteristics, a resolution compensation unit that divides the brightness of the first left-eye image data and the brightness of the second left-eye image data by two to calculate the left-eye average data and divides the brightness of the first right-eye image data and the brightness of the second right-eye image data by two to calculate the right-eye average data, and a de-gamma calibration unit that converts an output of the resolution compensation unit into a grayscale value.

4. A driving method of a stereoscopic image display apparatus comprising a display panel including pixels that are arranged in a matrix pattern at intersections of data lines and gate lines, a patterned retarder that includes a first retarder transmitting first polarized light from odd-numbered lines of the display panel and a second retarder transmitting second polarized light from even-numbered lines of the display panel, and polarization glasses that includes a first polarization filter transmitting the first polarized light from the first retarder and a second polarization filter transmitting the second polarized light from the second retarder, the method comprising:

calculating an average brightness of first left-eye image data included in an nth (n is a natural number) line of the 3D image data and second left-eye image data included in an n+2th line of the 3D image data to obtain left-eye average data;

calculating an average brightness of first right-eye image data included in an n+1th line of the 3D image data and second right-eye image data included in an n+4th line of the 3D image data to obtain right-eye average data;

converting the brightness of the left-eye average data and the right-eye average data into grayscale values; and displaying the converted left-eye average data and the converted right-eye average data on the display panel.

5. The driving method of claim 1, wherein obtaining the left-eye average data comprises:

calibrating brightness of each of the first left-eye image data and the second left-eye image data based on 2.2 gamma characteristics, and dividing the brightness of the first left-eye image data and the brightness of the second left-eye image data by two to calculate the left-eye average data.

6. The driving method of claim 5, wherein obtaining the right-eye average data comprises:

calibrating brightness of each of the first right-eye image data and the second right-eye image data based on 2.2 gamma characteristics, and dividing the brightness of the first right-eye image data and the brightness of the second right-eye image data by two to calculate the right-eye average data.

* * * * *